United States Patent [19]

Mori

[11] Patent Number: 4,770,220
[45] Date of Patent: Sep. 13, 1988

[54] HIGH STRENGTH THREE-PIECE WHEEL

[76] Inventor: Hiroshi Mori, 2751 Aqua Verde Cir., Los Angeles, Calif. 90077

[21] Appl. No.: 721,045

[22] Filed: Apr. 8, 1985

[51] Int. Cl.$^4$ ............................................. B60B 23/00
[52] U.S. Cl. .................................. 152/398; 152/409; 301/35 R; 301/11 CD
[58] Field of Search ............... 152/396, 397, 398, 402, 152/409, 405; 301/405, 35 R, 11 CD, 5 VH

[56] References Cited

U.S. PATENT DOCUMENTS

| | | | |
|---|---|---|---|
| 1,041,567 | 10/1912 | Ashton | 301/35 R |
| 1,389,937 | 9/1921 | Cockrill | 301/11 CD |
| 1,481,036 | 1/1924 | Stauber | 301/35 R |
| 2,868,258 | 1/1959 | Powers | 152/398 |
| 4,142,569 | 3/1979 | Walther et al. | 152/409 |
| 4,466,670 | 8/1984 | Kaji | 152/398 |

FOREIGN PATENT DOCUMENTS

| | | | |
|---|---|---|---|
| 326477 | 7/1919 | Fed. Rep. of Germany | 152/405 |
| 522399 | 6/1940 | United Kingdom | 152/409 |

Primary Examiner—James B. Marbert
Attorney, Agent, or Firm—Lyon & Lyon

[57] ABSTRACT

A three-piece wheel for vehicle tires for providing a greater positive offset comprising a wheel center, an inner rim and an outer rim wherein the rims are secured at their radially directed bases to a disk mount on the wheel center by a plurality of threaded fastening members. The inner rim defines an elongate curved tire support portion terminating at one end in an inner rim flange and at the other end in a radially directed base. The outer rim is generally T-shaped defining an outer rim flange portion for securing the tire in combination with the inner rim flange on the inner rim, a tire support portion extending over a portion of the inner rim for supporting the tire in combination with the inner rim and a radial base portion disposed inwardly of said tire support portion for supporting said tire support portion and for use insecuring the outer rim to the inner rim and wheel center.

2 Claims, 1 Drawing Sheet

HIGH STRENGTH THREE-PIECE WHEEL

This invention relates to a high strength three-piece wheel for providing increased positive offset for vehicle tires.

It is well-known and common practice to construct automotive wheels from separately manufactured discs or wheel centers and a rim. To enable one to tune the size of the wheel to specific needs, the wheel industry developed the three-piece wheel wherein the rim is comprised of two separate components, an inner rim and an outer rim. The separate rims define radially directed bases which are superposed over and secured to a peripheral mounting on the wheel center by fastening means. Such wheels, however, have limited strength and pose leakage problems between the two parts of the rim when used with a tubeless tire. The limited strength of such wheels also restricted the positive wheel offset which could be obtained. Positive wheel offset provides for a greater clearance within the inner portion of the wheel which can be employed to accommodate larger break drums to provide improved breaking performance. This is particularly significant on front wheel drive vehicles in view of current regulations restricting the positioning of the tire relative to the car body.

A solution to these strength and leakage problems is found in U.S. Pat. No. 4,466,670 wherein the configuration of the rims was designed to provide additional strength as well as an air-tight seal between the rims. While the wheel configuration disclosed therein also provides for some positive offset, the amount of such offset is still quite limited in view of the strength requirements of the outer rim flange when employing a greater positive offset. It would be highly desirable to provide a three-piece wheel which employs an outer wheel flange which retains the sealing advantages of the aforesaid patented structure and is of sufficient strength that it is capable of providing increased positive wheel offset.

It is therefore an object of the present invention to provide an improved three-piece wheel of sufficient strength to allow for increased positive offset.

It is another object of this invention to provide a three-piece wheel which will establish and maintain an air-tight condition between the inner and outer rim for use with a tubeless tire.

It is still a further object of the present invention to provide a three-piece wheel employing an outer rim having the tire valve stem housed therein.

These and other objects and advantages of the present invention will become readily apparent from the detailed description taken in conjunction with the accompanying drawings.

IN THE DRAWINGS

DESCRIPTION OF THE PREFERRED EMBODIMENT

Figure 1:
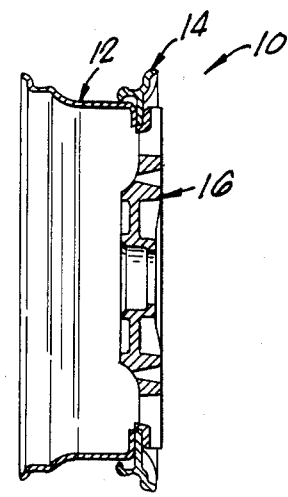
FIG. 1 is a sectional view of the three-piece wheel for embodying the present invention.
Figure 2:
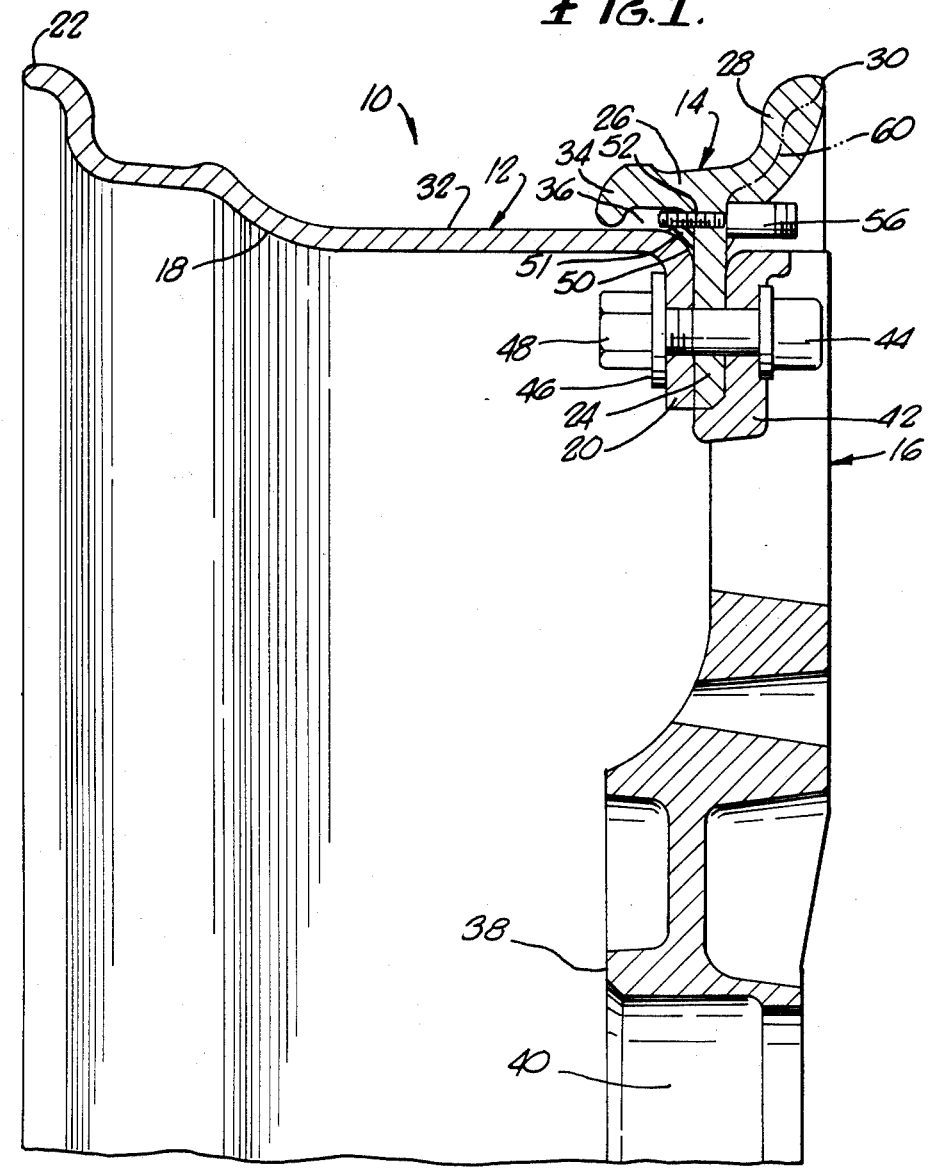
FIG. 2 is a fragmentary sectional view, on an enlarged scale, showing the positional relationship between the elements of the wheel shown in FIG. 1.

Referring to FIGS. 1 and 2 of the drawings, the threepiece wheel 10 of the present invention comprises an inner rim 12, outer rim 14 and wheel center 16. The inner rim 12 is of integral sheet metal construction, preferably an aluminum alloy, and is bent so as to define an inwardly curved portion 18 terminating at one end in a radially directed base 20 and at the other end in a raised inner rim flange 22.

The outer rim 14 is of forged or cast construction, preferably of an aluminum alloy material, and generally T-shaped defining a radial base portion 24 perpendicularly disposed with respect to a tire support bar 26. The outer end 28 of the tire support bar extends angularly outwardly to define an outer rim flange 30 which cooperates with inner rim flange 22 to accommodate a tire in a conventional manner. The tire support bar 26 extends horizontally over the outer portion 32 of the inner rim 12 and includes a projection 34 which is spaced outwardly from the inner rim a distance of at least 1 mm and together with the inner rim defines a chamber 36.

The wheel center 16 has a plurality of spaced apart spoke or mesh portions extending radially from a center hub 38 provided with an axle bore 40 for receiving a vehicle axle. A disc mount 42 is connected to the hub 38 by the plurality of spoke members. The inner and outer rims 12 and 14 and wheel center 16 have a plurality of common axially disposed apertures through which threaded fastening means 44 extend for cooperation with a like plurality of washers 46 and bolts 48 to secure the rims to the wheel center.

The inner and outer rims 12 and 14 define at their point of convergence a V-shaped groove 50 which is filled with a sealing material 51 such as silicon resin to establish an air-tight seal therebetween. While a weld could be employed in groove 50 to provide such a seal, a sealing material which retains some degree of elasticity is preferable to provide a proper seal under severe driving conditions.

The aforesaid configuration disposes the tire support bar 26 directly over the radial base portion 24 of the outer rim 14 in a rigid configuration (referred to herein as generally T-shaped) thereby maximizing the strength of the outer rim 14 and its ability to support a vehicle tire. This configuration also allows the radial base portion 24 of the outer rim 14 to be disposed outwardly toward the outer rim flange 30 without loss of support strength to provide a degree of increased positive wheel offset not obtainable with the three-piece wheels heretofore available.

In addition to providing sufficient strength to enable one to dispose the radial base portion 24 of the outer rim 14 directly below the outer rim flange 30, if desired, to maximize the possible positive offset, the configuration of the outer rim 14 also allows for the provision of a channel 52 extending therethrough and communicating with chamber 36 to accommodate a permanent built-in valve and stem 56 which would supply air to the tire through the air gap between projection 34 and the inner rim 12. Further, if desired, chamber 36 also renders the wheel 10 of the present invention capable of accommodating a sheet of ball bearings of the type used to employ centrifugal force for automatically balancing the vehicle wheel.

Finally, it should be noted that the thick forged construction of the outer rim allows the rim to be machined to provide the aesthetic appearance desired without adversely affecting the strength of the rim. Such machining is illustrated by the fathom line 60 in FIG. 2.

Figure 3:
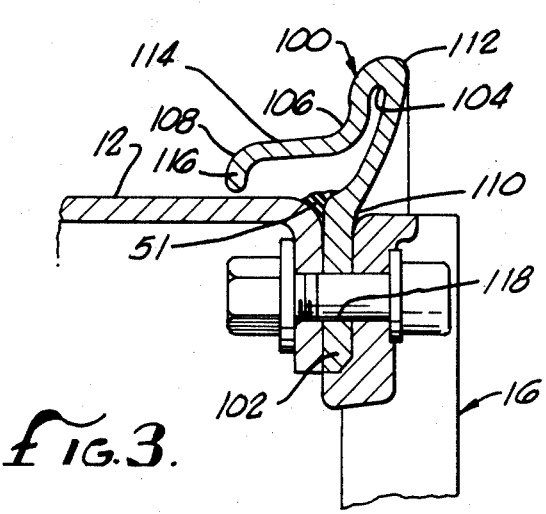
FIG. 3 is a partial sectional view showing an alternate embodiment of the wheel embodying the present invention.

A second embodiment of the present invention is illustrated in FIG. 3 wherein the outer rim 100 is bent from a sheet metal like the inner rim 12 and not forged as described in the prior preferred embodiment. In this embodiment, the rim 100 is bent slightly outwardly at 110, radially inwardly at 104, axially inwardly at 106 and radially inwardly at 108 with a generally T-shaped configuration defining a radial base portion 102, outer rim flange 112, tire support bar 114 and projection 116. The radial base portion 102 is provided with a plurality of apertures 118 for securement of the outer rim to the inner rim 12 and wheel center 16 in the manner described with respect to the prior embodiment.

Various changes and modifications of the present invention may be made in carrying out the present invention without departing from the spirit and scope thereof. Insofar as these changes and modifications are within the purview of the appended claims, they are to be considered part of the present invention.

I claim:

1. A three-piece wheel for vehicle comprising
   a wheel center defining an annular mount extending about the perimeter thereof;
   an inner rim of integral construction defining an annualr radial base portion extending parallel to said mount and an outwardly projecting inner rim flange; and outer rim of forged or cast construction defining a generally T-shaped configuration and comprising an annular radial base portion disposed parallel to said mount and terminating in a perpendicularly disposed axial tire support bar, one end of said bar extending over a portion of said inner rim and terminating in an inwardly directed radial projection spaced from said inner rim, the other end of said bar extending outwardly and defining an outer rim flange adapted to cooperate with said inner rim flange for securing a vehicle tire thereon, said tire support bar and said inner rim defining a chamber therebetween, said projection and inner rim defining an air gap communicating with said chamber, a channel extending axially through said outer rim communicating with said chamber, valve means disposed within said chamber for use in filling the vehicle tire with air upon mounting said tire on the said wheel and fastening means for securing said radial base portions of said inner and outer rims to said mount.

2. The combination of claim 1 including sealing means disposed within said chamber between said inner and outer rims to prevent air from passing therebetween and wherein said mount and said radial base portions define a plurality of aligned spaced apertures extending therethrough and said fastening means comprises a corresponding plurality of threaded fasteners extending through said apertures and securing together said mount and said base portions.

* * * * *